(12) United States Patent
Alley

(10) Patent No.: US 11,098,933 B2
(45) Date of Patent: Aug. 24, 2021

(54) DIRECT HEAT EXCHANGE SYSTEM

(71) Applicant: Tony Randolph Alley, Rancho Cordova, CA (US)

(72) Inventor: Tony Randolph Alley, Rancho Cordova, CA (US)

( * ) Notice: Subject to any disclaimer, the term of this patent is extended or adjusted under 35 U.S.C. 154(b) by 792 days.

(21) Appl. No.: 14/563,991

(22) Filed: Dec. 8, 2014

(65) Prior Publication Data

US 2016/0161157 A1 Jun. 9, 2016

Related U.S. Application Data

(60) Provisional application No. 61/913,038, filed on Dec. 6, 2013.

(51) Int. Cl.
| | |
|---|---|
| *F25B 30/00* | (2006.01) |
| *F25B 39/00* | (2006.01) |
| *F25B 41/04* | (2006.01) |
| *F25B 30/02* | (2006.01) |

(52) U.S. Cl.
CPC .............. *F25B 30/00* (2013.01); *F25B 30/02* (2013.01); *F25B 39/00* (2013.01); *F25B 41/04* (2013.01); *F25B 2339/00* (2013.01)

(58) Field of Classification Search
CPC ......... F25B 30/00; F25B 13/00; F24F 5/0089; F24F 5/0092; F24D 3/14; F24D 3/12; F24D 3/16; F24D 3/18; F24D 3/141; F24D 3/148; F24D 2220/006
USPC ....................... 62/324.5, 115, 498, 452, 453; 165/53–55, 58, 48.1, 49
See application file for complete search history.

(56) References Cited

U.S. PATENT DOCUMENTS

| | | | | |
|---|---|---|---|---|
| 2,462,557 | A * | 2/1949 | Santee | F24D 15/04 165/49 |
| 2,469,963 | A * | 5/1949 | Grosjean | F24D 3/14 165/56 |
| 4,635,710 | A * | 1/1987 | Shelley | F24D 3/165 165/171 |
| 5,261,251 | A * | 11/1993 | Galiyano | F24F 5/0046 62/176.6 |
| 6,330,980 | B1 * | 12/2001 | Fiedrich | F24D 3/14 165/53 |

* cited by examiner

*Primary Examiner* — Joseph F Trpisovsky
(74) *Attorney, Agent, or Firm* — Bay Area IP Group; Ariel Bentolila

(57) ABSTRACT

A direct heat exchange system uniformly transfers heat through a multiphase substance, such as a refrigerant, to a barrier that emits heat radiantly and convectively. The system solely uses the multiphase substance to exchange heat between the multiphase substance and the barrier. No intermediary fluids are used. A heat exchange portion, such as a heat pump, absorbs and emits heat and transfers it to the multiphase substance. A tube portion carries the multiphase substance to the barrier. The heat is directly exchanged between the tube and the barrier. The barrier emits radiant heat or absorbs heat. A tube fastener fastens the tube to the barrier. A thermal mass portion stores heat behind the barrier. A dehumidification coil helps prevent indoor condensation and tempers the temperature of the air proximal to the barrier by drying the air. A decorative panel covers the tube portion and the thermal mass portion.

17 Claims, 13 Drawing Sheets

DIRECT HEAT EXCHANGE SYSTEM

CROSS-REFERENCE TO RELATED APPLICATIONS

The present Utility patent application claims priority benefit of the U.S. provisional application for patent Ser. No. 61/913,038, entitled "Direct refrigerant heat exchange radiant heating/cooling and integrated fresh air dehumidifier/tempering coil" filed 6 Dec. 2014, under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to a direct heat exchange system involving a multiphase substance with no other intermediary fluids. More particularly, the invention relates to a direct heat exchange system involving a multiphase substance with no other intermediary fluid that uniformly transfers heat between a multiphase substance and a barrier.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that Typically, a heat exchanger is a piece of equipment built for efficient heat transfer from one medium to another. The media may be separated by a solid wall to prevent mixing or they may be in direct contact.

One can expect that the failure to directly transfer heat may result in an inefficient loss of heat as the laws of thermodynamics typically dictate. Additionally, a heat pump can be expected to work excessively to achieve a desired temperature for an intermediary fluid.

Typically, direct contact heat exchangers involve heat transfer between hot and cold streams of two phases in the absence of a separating wall. Thus such heat exchangers can be classified as: gas to liquid; immiscible liquid to liquid; and solid-liquid or solid to gas. A refrigerant is a substance or mixture, usually a fluid, used in a heat pump and refrigeration cycle. In most cycles it undergoes phase transitions from a liquid to a gas and back again.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates an exemplary path of a multiphase substance in a heating mode, and FIG. 2B illustrates an exemplary path of a multiphase substance in a cooling mode, in accordance with an embodiment of the present invention;

FIG. 4A illustrates a perspective view, and FIG. 4B illustrates an elevated side view, in accordance with an embodiment of the present invention;

FIG. 5A illustrates a top view, and FIG. 5B illustrates an elevated side view, in accordance with an embodiment of the present invention;

FIG. 8A illustrates a top view, and FIG. 8B illustrates a side view, in accordance with an embodiment of the present invention;

FIG. 10A illustrates a butterfly figure, FIG. 10B illustrates a star figure, and FIG. 10C illustrates a leaf figure.

Figure 1:
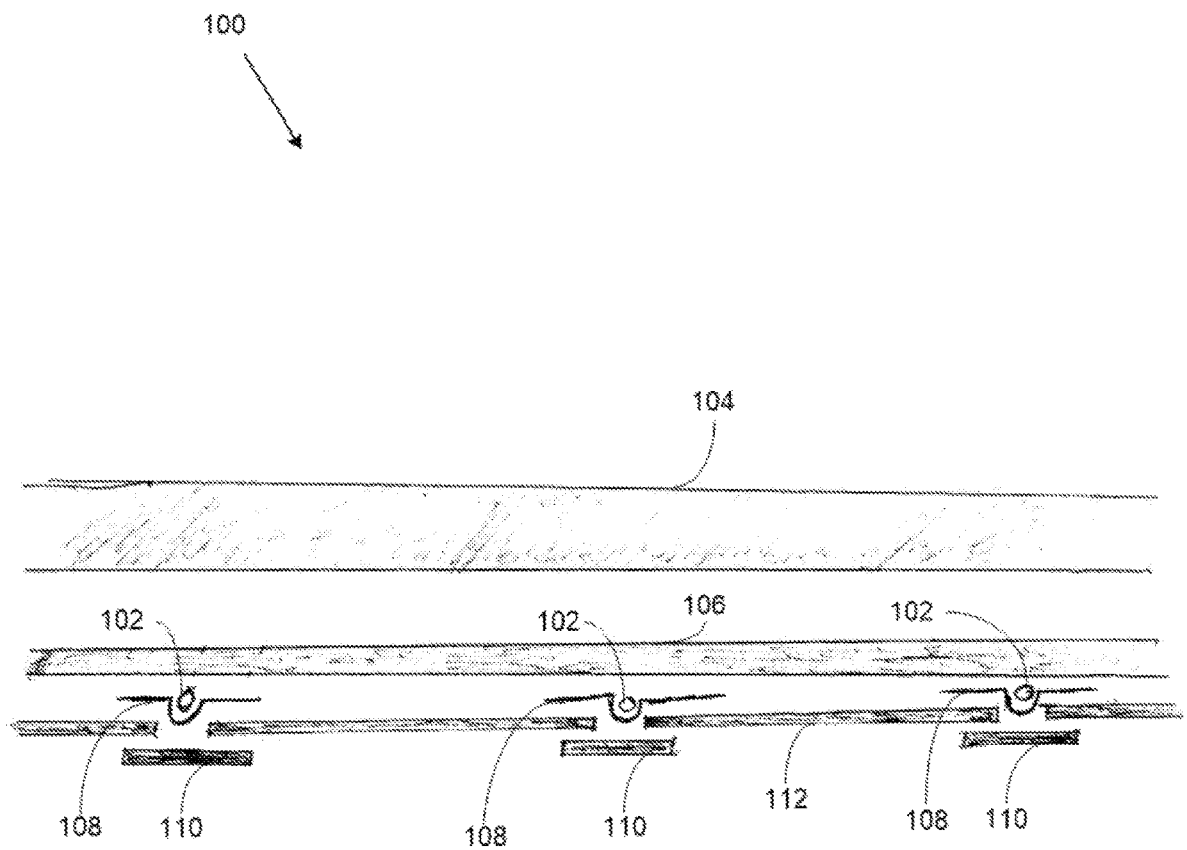
FIG. 1 illustrates a side view of an exemplary direct heat exchange system having an exemplary tube portion imbedded in an exemplary barrier, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of heat exchange systems that transfer thermal energy to heat or cool an area of ambient air that may be provided by preferred embodiments of the present invention. In one embodiment of the present invention, a direct heat exchange system may uniformly transfer heat through a multiphase substance to a barrier portion that emits heat radiantly and convectively. The multiphase substance may include a refrigerant. The system solely uses the multiphase substance to exchange heat with the barrier. There are no intermediary fluids or gases used to exchange heat with the multiphase substance. In this manner, a heat pump operates more efficiently since there is less loss of heat during transfer. A heat exchange portion, such as a heat pump absorbs and emits heat and transfers it to the multiphase substance. A tube portion carries the multiphase substance to the barrier. The heat is exchanged between the tube and the barrier directly. The barrier emits radiant heat or absorbs heat from its surface. A tube fastener fastens the tube to the barrier portion. A thermal mass portion stores heat behind the barrier. A dehumidification coil helps prevent indoor condensation and temper the temperature of the air proximal to the barrier by drying the ambient air.

In some embodiments, the system may utilize a cooling mode or a heating mode to respectively cool or heat an area through the barrier. In either case, a compressor may be used to compress the multiphase substance to a high pressure to create condensation within the multiphase substance. The condensed multiphase substance may then pass through a heat exchanger portion, such as a heat pump, that either draws in heat or releases heat into the multiphase substance. A flow control portion may then force the multiphase substance though the barrier to exchange heat with the barrier. As the multiphase substance passes through the barrier, the pressure is inadvertently lowered. The lower pressure multiphase substance may then reenter the compressor (to raise the pressure of the multiphase substance) and the heat exchanger portion (to boil the multiphase substance) for continuing the cycle. In one embodiment, a portion of the multiphase substance may pass through a dehumidification coil to cause the dew point of the air to become lower than the surface temperature of the barrier that is being used to cool the conditioned space. This helps reheat and refresh the air that is proximal to the barrier.

In some embodiments, the system may carry the multiphase substance through a tube portion. The tube portion may include a tube that is configured to carry the multiphase substance and integrate imbed into the barrier. The multiphase substance exchanges heat through the tube portion. The tube portion may be imbedded in a barrier that exchanges heat with the multiphase substance for cooling or heating the air proximal to the barrier. In some embodiments, a conduction portion may rest between the tube portion and the barrier. From the tube portion, the heat may be exchanged through the conduction portion that enhances the transfer of heat.

In one embodiment, the conduction portion may include a metal plate. From the conduction portion, the heat may be exchanged with the barrier to the ambient air. At least one tube fastener may join the tube portion to the barrier. In one embodiment, the tube fastener may include a conductive, elongated C-clamp that wraps around the tube portion in different segments and helps transfer heat between the tube portion, the conduction barrier, and the barrier. In some embodiments, where the tube portion imbeds in the barrier, a sub barrier portion may provide a supportive platform. In some embodiments, at least one barrier anchor is arranged to extend from the sub barrier portion and/or the barrier to help stabilize the tube portion. The barrier anchor may include a joist in a ceiling, wall, or floor.

It is significant to note that no intermediary fluids or gases are heated or cooled by the multiphase substance, and then carried to the barrier. Rather, there is a direct heating or cooling process between the multiphase substance and the conduction portion and the barrier. In some embodiments, the system provides creates different types of heat dispersions on the barrier. For example, a radiant heat effect occurs as the barrier emits heat directly into the ambient air. Also, a convective heat effect occurs as the ambient air passes into contact with the warmer barrier and consequently raises in temperature.

Those skilled in the art will recognize that imbedding the tube portion into a barrier, such as a ceiling, wall, or floor, may require decoupling and elevating portions of the barrier. Since the tube portion carries a multiphase substance, rather than a fluid, the thickness and diameter of the tube portion may be substantially less. Thus, the smaller dimensions of the tube portion enable the barrier to be moved less than a standard fluid carrying pipe, and the like.

In some embodiments, a flow control portion may distribute the multiphase substance through a plurality of tube branches. The tube branches may include individual tube portions that diverge throughout the barrier to create maximum heat exchange exposure. In some embodiments, each tube branch is controlled independently to create a more efficient distribution of multiphase substance, and therefore heat exchange. In some embodiments, a thermal mass portion may at least partially surround the tube portion, so as to minimize heat loss during the heat exchange by serving as an insulation. The thermal mass portion may fill the spaces between the barrier and the conduction portion.

FIG. 1 illustrates a side view of an exemplary direct heat exchange system having an exemplary tube portion imbedded in an exemplary barrier, in accordance with an embodiment of the present invention. In one aspect, a direct heat exchange system 100 may uniformly transfer heat through a multiphase substance to a barrier portion that emits heat radiantly and convectively. The multiphase substance may include a refrigerant. Those skilled in the art will recognize that the refrigerant has a higher boiling point and is less susceptible to temperature swings. The system solely uses the multiphase substance to exchange heat with the barrier. There are no intermediary fluids or gases used to exchange heat with the multiphase substance. In this manner, a heat pump may operate more efficiently since there is less loss of thermal energy in the transfer of heat. Additionally, the system may comprise a dehumidification coil to help prevent indoor condensation and temper the temperature of the air proximal to the barrier.

In some embodiments, the system may include a tube portion 102 that carries the multiphase substance. The tube portion may imbed into a barrier portion 104 for exchanging heat therebetween. At least one tube fastener 108 may help fasten the tube portion to the barrier portion. A tube fastener cover 110 may form a protective and decorative overlaying surface to the tube portion. A conductor portion 106 may be arranged between the tube portion and the barrier portion to help conduct the heat. A decorative portion 112 may form a decorative surface opposite the barrier, covering at least a portion of the tube portion and the conductor portion.

It is significant to note that no intermediary fluids or gases are heated or cooled by the multiphase substance, and then carried to the barrier. Rather, there is a direct heating or cooling process between the multiphase substance and the conduction portion and the barrier. In some embodiments, the system provides creates different types of heat dispersions on the barrier. For example, a radiant heat effect occurs as the barrier emits heat directly into the ambient air. Also, a convective heat effect occurs as the ambient air passes into contact with the warmer barrier and consequently raises in temperature.

Those skilled in the art will recognize that the traditional intermediary fluids used to transport heat between the multiphase substance and the barrier portion may be inefficient. Often, the intermediary fluid may lose (in heating) or gain (in cooling) about 10° in temperature change as it travels through a fluid tube. In heating the heat pump must then replenish the fluid with heat by raising its sensible temperature back up 10° warmer and in cooling the heat pump must lower the temperature 10° before it is pumped back to the radiating surface of the barrier portion to warm/cool the conditioned space. Thus, the temperature, swings up and down in order to transport heat to and from the source of heat/cooling. The system avoids this inefficiency by directly exchanging heat with the barrier portion.

The indirect heat exchange may pose numerous disadvantages and inefficiencies during cooling or heating, which are explained below. The direct heat exchange system solves many of these disadvantages as explained below. In one example of the efficiency provided by using a multiphase substance to directly exchange heat, rather than an intermediary fluid, the pressure in the multiphase substrate is more easily manipulated than the pressure in the intermediary fluid. This enables the compressor to work less. For example, unlike the intermediary fluid, the pressure for the multiphase substance is lowered in heating mode from 418 to 318 psi because it does not need to condense to 120° Fahrenheit. This is because the multiphase substrate at 100° Fahrenheit only has a condensing pressure of 317 psi, which is about 101 psi less than the intermediary fluid. Thus, the multiphase substrate can be forced directly into the tube portion in gas phase. Consequently, instead of a 100° Fahrenheit intermediary fluid in the tube portion, a 100° Fahrenheit multiphase substance can be used. Similarly, in the cooling mode, the multiphase substance pressure may be raised from 118 to 170 psi. The difference is 52 psi reduced pressure difference between the high side and the low pressure that the compressor must pump against.

In another example of the inefficiencies of the indirect heat exchange system, the temperature swing for the intermediary fluid, such as water, is large because water uses sensible heat. Conversely, the direct heat exchange system uses latent heat rather than sensible heat. The direct heat exchange system does not have such a large temperature swing. Chiefly, this is because of the chemical composition of the multiphase substance, which may be a refrigerant with a higher boiling point. Thus, as the heat is absorbed by the multiphase substance, the temperature does not change, only the state of the multiphase substance changes from liquid to gas while absorbing the heat. And while giving off heat the state changes from gas to liquid but the temperature does not change.

Additionally, there may be several beneficial improvements from using latent heat compared to sensible heat. For one, a 100° multiphase substance passes through the tube portion in the heating mode. The multiphase substance must be about 5° warmer to over compensate for the temperature swing. The heating intermediary fluid is reduced in temperature as it gives its heat to the radiating surface by 10°, so that the average temperature is actually 95°. Using the latent heat method the system keeps the multiphase substance at a constant temperature. While the multiphase substance travels the length of the tube portion there is no temperature swing. So if a 95° tube portion is needed then the multiphase substance may be heated at 95° rather than at 100° to compensate for the temperature swinging of sensible heat. Consequently, the reduced high side pressure which actually only needs to be 295 psi, and not the 317 psi. So by using the direct heat exchange in the heating mode to achieve the same average tube portion temperature the high side pressure may be reduced in the above example from 418 psi to 295 psi resulting in significant energy reduction and increased longevity of the compressor from less strenuous operating pressures.

In another example of the efficiencies of the cooling mode of the direct heat exchange over the indirect heat exchange, the indirect method requires the intermediary fluid to be cooled up to 5° cooler to compensate for the sensible heat temperature swing. So in the above example it is necessary to chill the intermediary fluid to 60° to get an average fluid temperature of 65°. Conversely, with the direct heat exchange system, the multiphase substance may be evaporated at 65°, which corresponds to 185 psi. So 40° (118 psi) for the direct exchange system, compared to 65° (185 psi) for the indirect exchange results in a 67 psi reduction in the difference from the high-side pressure compared to the low-side pressure.

Another disadvantage of the indirect heat exchange is that maintaining even temperature throughout the conditioned space is much more of an engineering challenge and complexity. Because of the temperature swing of the intermediary fluid, it is important that not all of the tubes that have the warmer water in the beginning of the cycle (in heat mode). Also, the tubes should not be bunched together where the intermediary fluid is at the end of its cycle and therefore has 10° cooler intermediary fluid. This is because if the tubes are bunched together non-uniformed temperatures occur in the conditioned space. The tubing has to be engineered for each job so that the cooler tubing is proportionately mixed with the warmer tubing. The advantage of using the direct heat exchange system is that the multiphase substance stays at a constant temperature throughout the phase change and therefor so do the tubes and therefor is not that critical where the tubes start and end.

Yet another disadvantage of the indirect heat exchange is that without zoning, all the tube branches receive a constant flow of intermediary fluid. The pump may pump the same volume of intermediary fluid proportionately to each tube branch circuit regardless of the temperature in the zone that that branch circuit is heating/cooling. So the tendency is more toward uneven temperatures throughout the conditioned space because 1) heating/cooling loads (needs) can be different than the room-by room-calculations that were estimated by doing load calculations and 2) the heating/cooling loads (needs) in each room can change from summer to winter, for example upstairs needs more cooling than downstairs in warmer seasons and downstairs needs more heating than upstairs in colder seasons and the heating/cooling needs changes from hour to hour also. For example, without limitation, when the sunsets in the west the cooling needs on the west side can greatly increase but only for the west side. A non-zoned indirect heat exchange may continue to pump the same volume of intermediary fluid to each branch regardless of the changing needs of the conditioned areas. It is not sensitive and therefor responsive to these changing needs.

The advantage of the direct heat exchange system is that each tube branch has its own temperature-sensitive refrigerant-regulating device (for example: TXV, low side float valve for cooling and high side float valve for heating). These regulating devices are temperature sensitive and will tend towards adjusting the volume of each tube branch depending on the changing needs of each branch. There is no special electrical zoning controls like extra thermostats and electric valves required for these branch circuits to tend toward adjusting the multiphase substance flow to allow more to the area of the conditioned space that have a greater need and less to areas that have less need.

Yet another disadvantage of the indirect heat exchange is that it is critical that when engineering the branch circuits that each tubing loop must be approximately the same length. This length requirement is necessary to avoid unbalanced water flow resulting in the shorter branch loops getting too much intermediary fluid and the other loops receiving less intermediary fluid. This results in uneven temperature conditions throughout the conditioned space and if unbalanced enough will even result in damage to the heat pump.

The advantage of the direct heat exchange system is that the engineering is far easier because the branch loops can be of different lengths because the multiphase substance regulating devices will control the flow of the multiphase substance to accommodate the need of each tube branch regardless of how long the loop is. This is true for both heating and cooling. Those skilled in the art will recognize that this a considerable beneficial advantage because most residential HVAC systems are not engineered by a professional engineer doing the full mechanical engineering calculations, etc. Residential systems are installed based on what the installer thinks is best. The direct heat exchange system will be far more forgiving/tolerant of not having been properly engineered. Another advantage of the individually regulated branch loops is that each room of a house may have a different size and will not only have changing load needs, but rather have a different square footage and will get the amount of tubing that is proportionate to that size room. Bigger rooms will get more tubing and smaller rooms will get less tubing. By regulating each branch this will also accommodate this non-equal-branch-loop lengths which could differ from one room to another room and this is with no special zoning controls.

Yet another disadvantage of the indirect heat exchange is that there must be a separate water pump. This gets even more complex if there is zoning then there are often multiple pumps involved or a variable speed pump. The direct heat exchange system eliminates the added equipment and expense altogether.

Yet another disadvantage of the indirect heat exchange is that it needs a refrigerant-to-water heat exchanger. No matter how efficient that this heat exchanger is it will never reach perfection where perfect or total heat exchange occurs. And heat exchangers that even approach that within a few degrees are so expensive that they are impracticable at this time. In cooling mode if the intermediary fluid flow gets blocked some heat exchangers are intolerant of this and burst either allowing the intermediary fluid into the conditioned space or the intermediary fluid getting into the refrigerant system which necessitates discarding of an expensive piece of equipment. The direct heat exchange system eliminates the need for this unnecessary complexity of a refrigerant-to-water heat exchanger.

Yet another disadvantage of the indirect heat exchange is that air may enter into the tubes. The air must be purged. For the purging, pressure regulating valves and tanks are needed. Unfortunately, with the fill valves, some of the intermediary fluid may leak back past the fill valve into the structure's water supply or city's water supply and contaminate it which is a health issue because sometimes this intermediary fluid that is circulating in the tubes has been in there for years and has putrefied. The direct heat exchange system eliminates this problem because there is no intermediary fluid.

Yet another disadvantage of the indirect heat exchange is that the water in the tube portion may freeze, resulting in burst pipes when the off, either from non-occupancy or system failure. The direct heat exchange system eliminates this problem because there is no water to freeze.

Figure 2A:
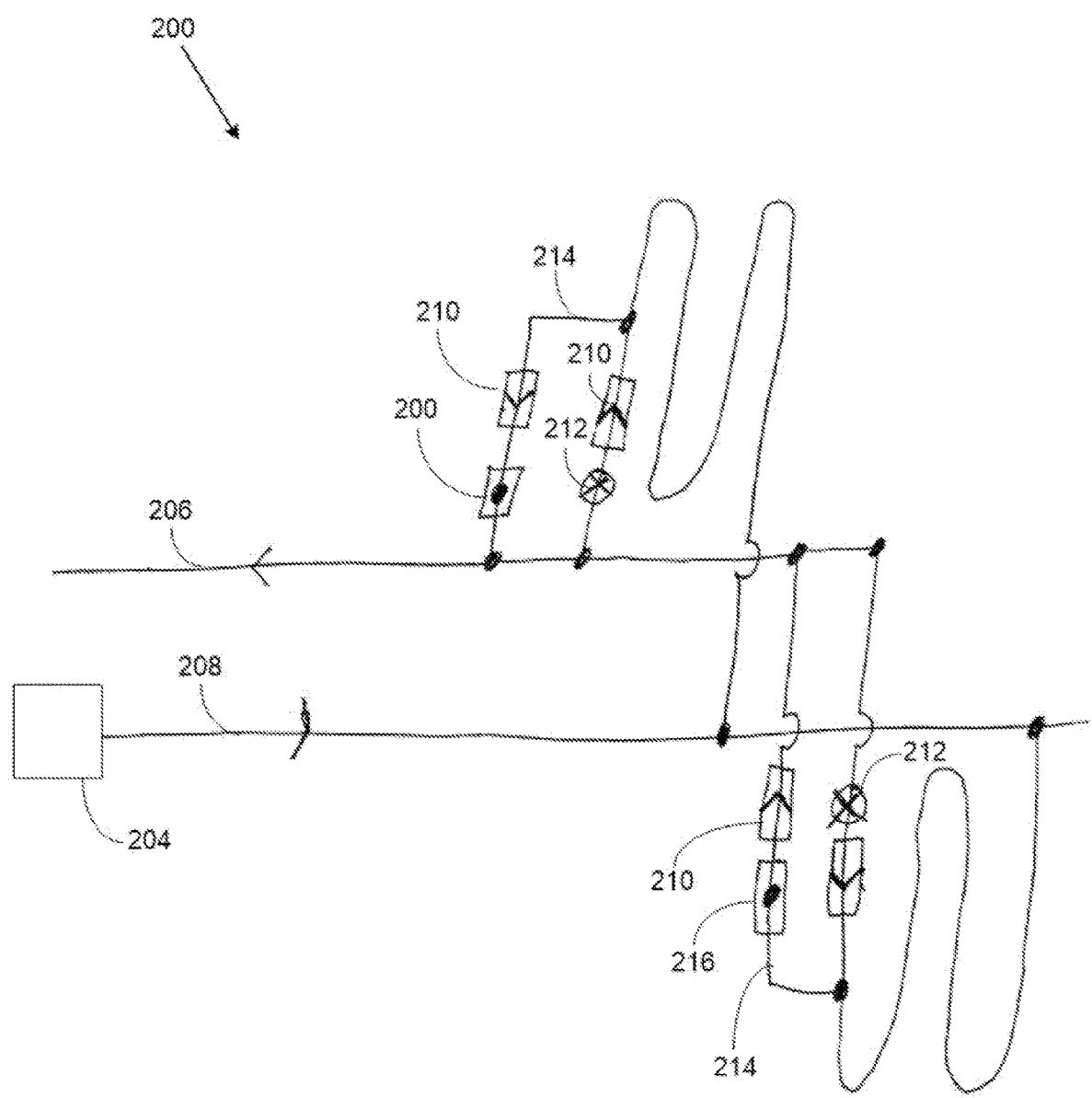
FIGS. 2A and 2B illustrate diagrams of an exemplary heating and cooling mode for a direct heat exchange system, where
Figure 2B:
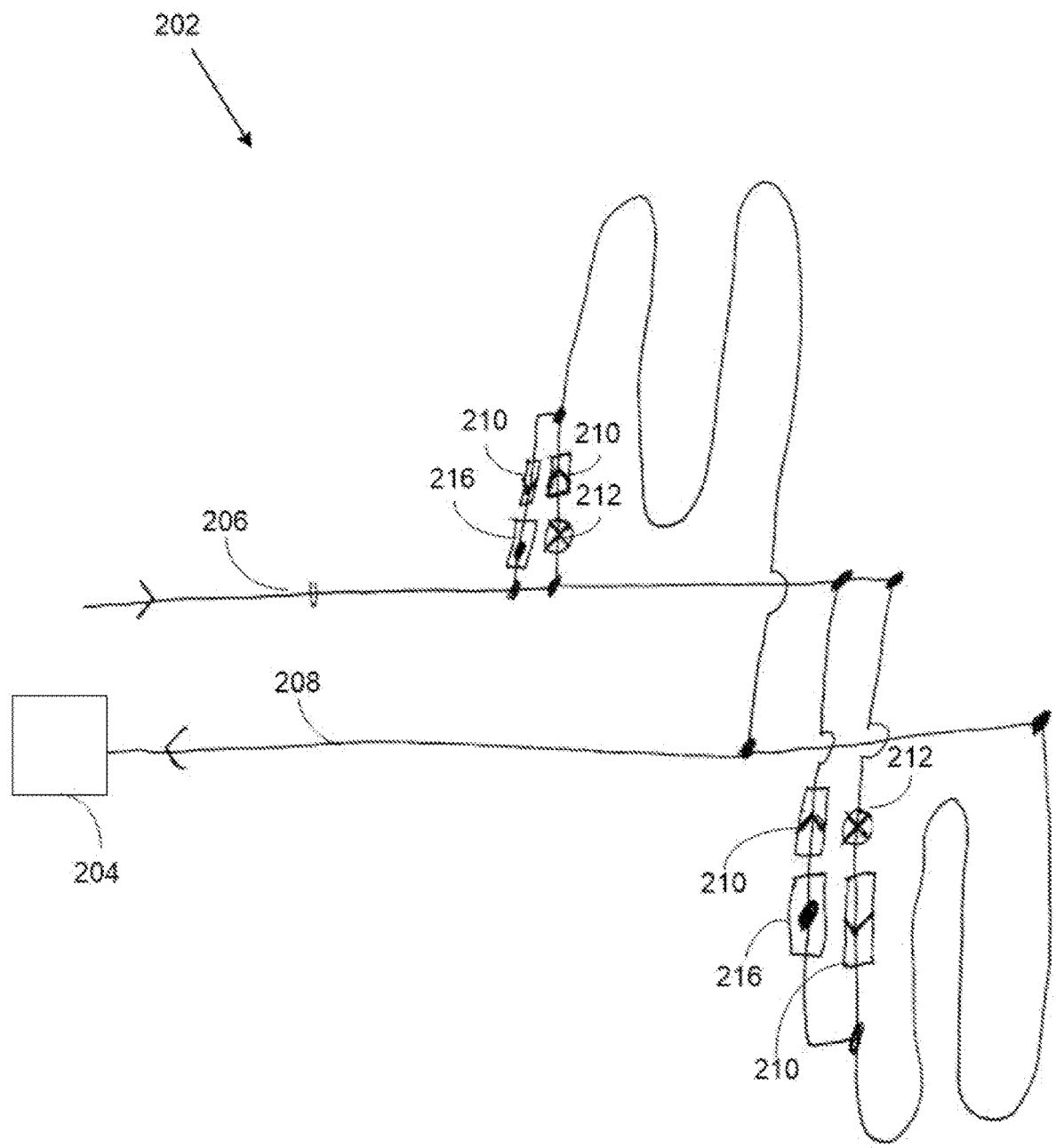

FIGS. 2A and 2B illustrate diagrams of an exemplary heating and cooling mode for a direct heat exchange system, where FIG. 2A illustrates an exemplary path of a multiphase substance in a heating mode, and FIG. 2B illustrates an exemplary path of a multiphase substance in a cooling mode, in accordance with an embodiment of the present invention. In one aspect, the system may utilize a heating mode 200 or a cooling mode 202 to respectively cool or heat an area through the barrier. In the case of the heating mode, a compressor may be used to compress the multiphase substance to a high pressure to create condensation within the multiphase substance. The condensed multiphase substance may then pass through a heat exchanger portion 204, such as a heat pump, that either draws in heat or releases heat into the multiphase substance. In the case of the heating mode, the heat exchange portion draws heat form the air and the ground, and transfers the heat to the condensed multiphase substance. The heat exchange portion may include, without limitation, refrigerant-to-air-source, refrigerant-to-water-source, refrigerant-to-evaporative-cooling, and refrigerant-to-ground-source.

In some embodiments, a flow control portion 216 may then force the multiphase substance though a liquid line 206 to the barrier for exchanging heat with the barrier. The flow control portion may include, without limitation, a TXV, or a low/high side float. Additional components that regulate the flow may include a check valve 210, a metering device 212, and a tube joint 214. As the multiphase substance passes through the barrier, the pressure is inadvertently lowered. The lower pressure multiphase substance may then reenter the compressor (to raise the pressure of the multiphase substance) and the heat exchanger portion (to boil the multiphase substance) through a vacuum line 208 for continuing the cycle.

As shown in FIG. 2B, the cooling mode is similar, except that the multiphase substance flows in the opposite direction, and the heat exchanger draws off heat form the condensed multiphase substance. In one embodiment, a portion of the multiphase substance may pass through a dehumidification coil (not shown) to cause the dew point of the air to become lower than the surface temperature of the barrier that is being used to cool the conditioned space. This helps reheat and refresh the air that is proximal to the barrier.

Figure 3:
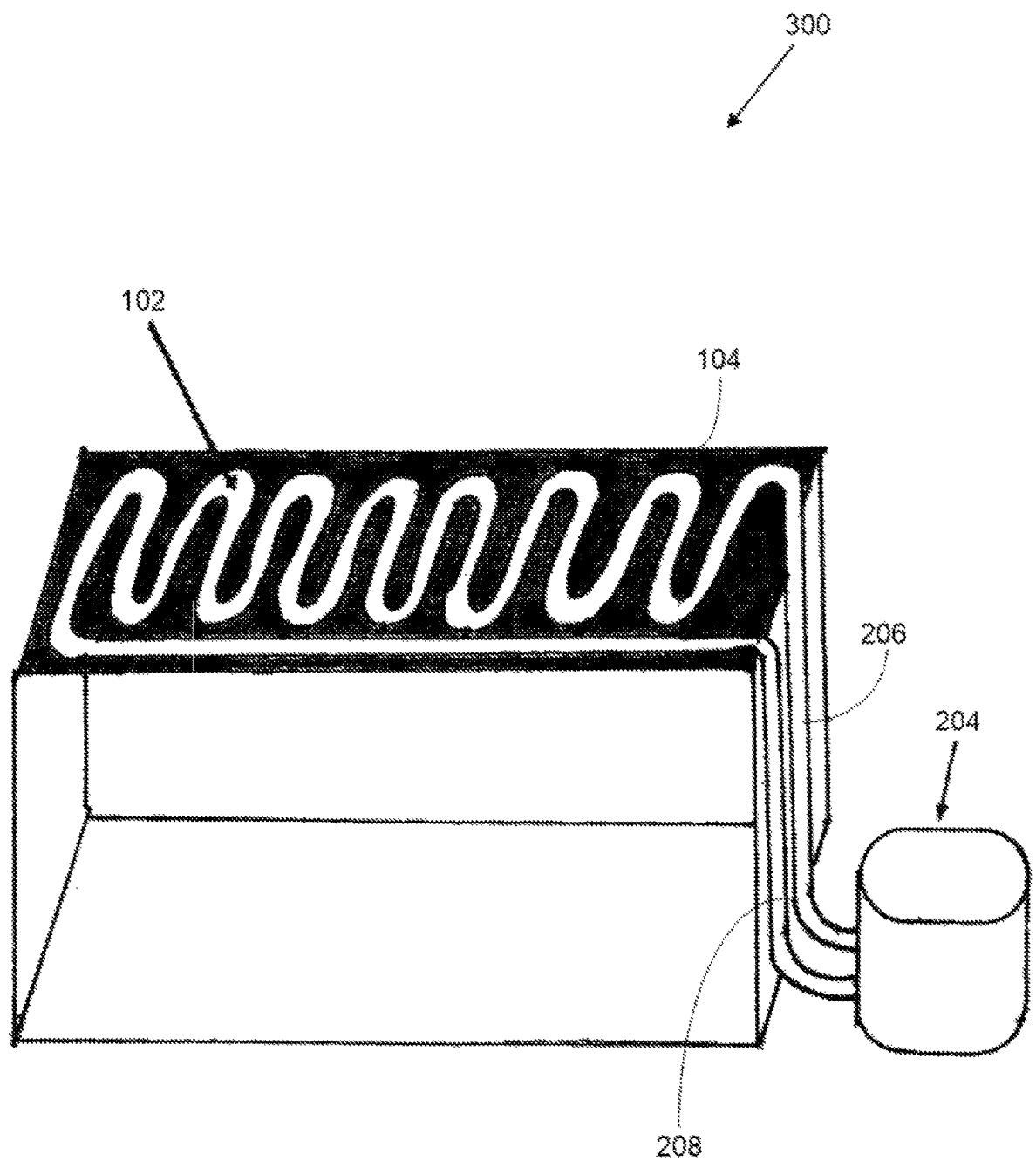
FIG. 3 illustrates a perspective view of an exemplary direct heat exchange system having an exemplary tube portion imbedded in an exemplary ceiling barrier, in accordance with an embodiment of the present invention.

FIG. 3 illustrates a perspective view of an exemplary direct heat exchange system having an exemplary tube portion imbedded in an exemplary ceiling barrier 300, in accordance with an embodiment of the present invention. In one aspect, the system may carry the multiphase substance through a tube portion. The tube portion may include a tube that is configured to carry the multiphase substance and integrate imbed into the ceiling barrier. The multiphase substance exchanges heat through the tube portion. The tube portion may be imbedded in a barrier, such as the ceiling barrier, that exchanges heat with the multiphase substance for cooling or heating the air proximal to the barrier. In one embodiment, the ceiling barrier may be used in an attic above ceiling sheetrock.

In some embodiments, a conduction portion may position between the tube portion and the barrier portion. The conduction portion may serve as a conductive agent to carry thermal energy between the tube portion and the barrier portion. The conductor portion may include, without limitation, a plate of copper, aluminum, or generally conductive metal. From the tube portion, the heat may be exchanged through the conduction portion that enhances the transfer of heat. In one embodiment, the conduction portion may include a metal plate that replaces a ceiling sheetrock. From the conduction portion, the heat may be exchanged with the barrier to the ambient air.

Figure 4A:
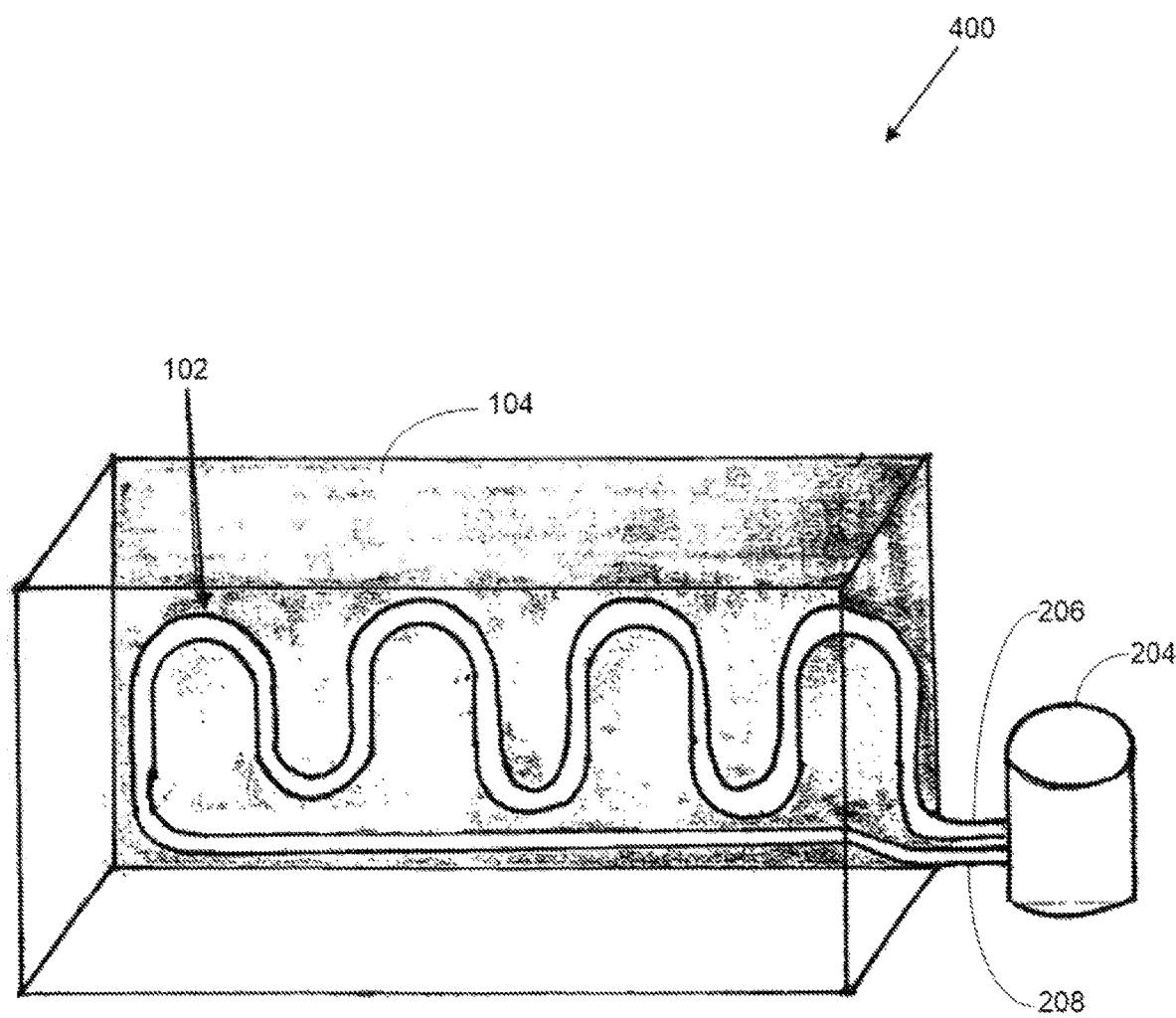
FIGS. 4A and 4B illustrate views of an exemplary direct heat exchange system having an exemplary tube portion imbedded in an exemplary wall barrier, where
Figure 4B:
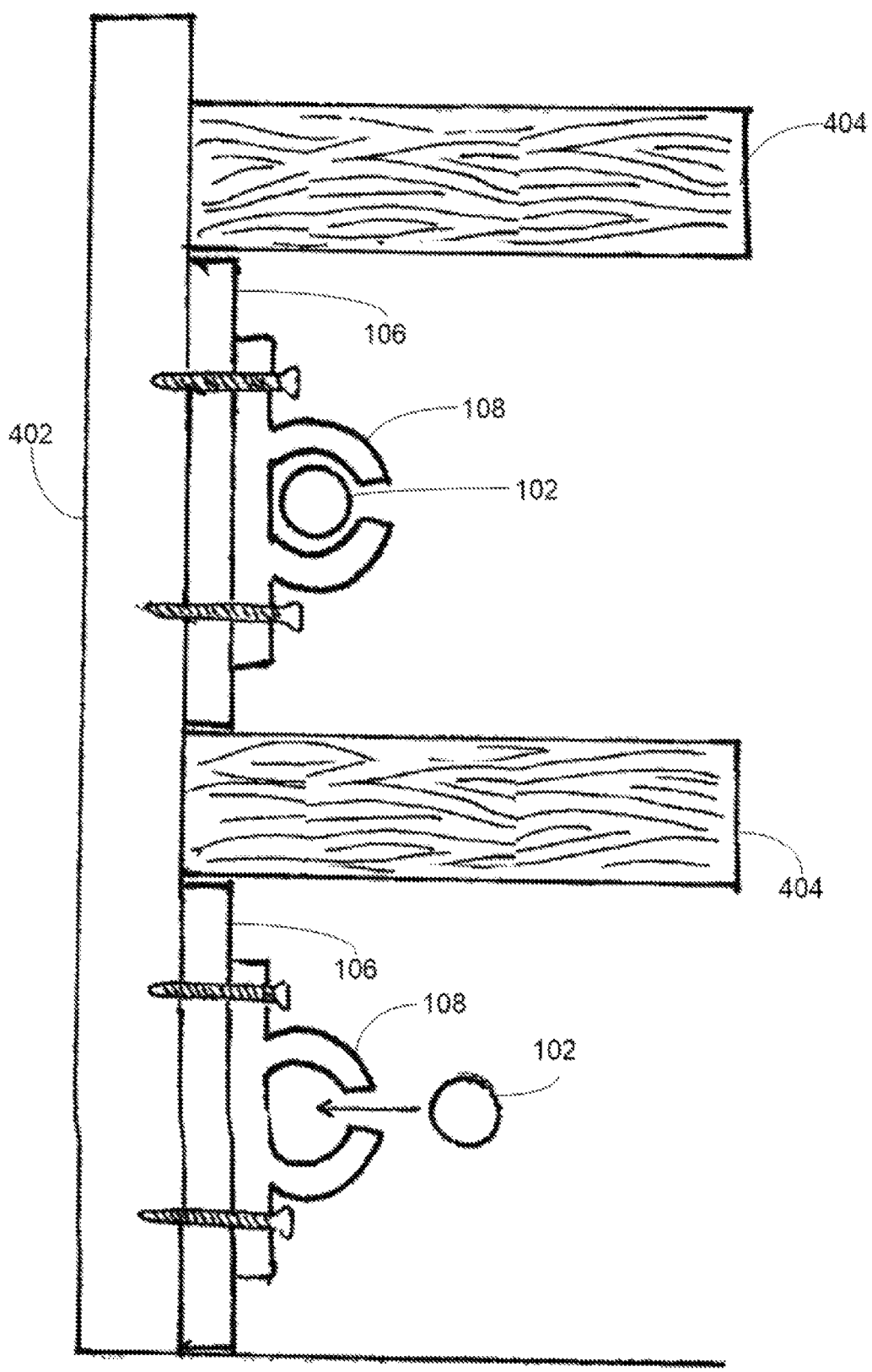

FIGS. 4A and 4B illustrate views of an exemplary direct heat exchange system having an exemplary tube portion imbedded in an exemplary wall barrier, where FIG. 4A illustrates a perspective view, and FIG. 4B illustrates an elevated side view, in accordance with an embodiment of the present invention. In one aspect, at least one tube fastener may join the tube portion with the barrier. In one embodiment, the tube fastener may include a conductive, elongated C-clamp that wraps around the tube portion in different segments and helps transfer heat between the tube portion, the conduction barrier, and the barrier. In some embodiments, where the tube portion imbeds in the barrier, a sub barrier portion 402 may provide a supportive platform opposite the barrier. In some embodiments, at least one barrier anchor 404 is arranged to extend from the sub barrier portion and/or the barrier to help stabilize the tube portion. The barrier anchor may include, without limitation, a joist in a ceiling, wall, or floor.

Figure 5A:
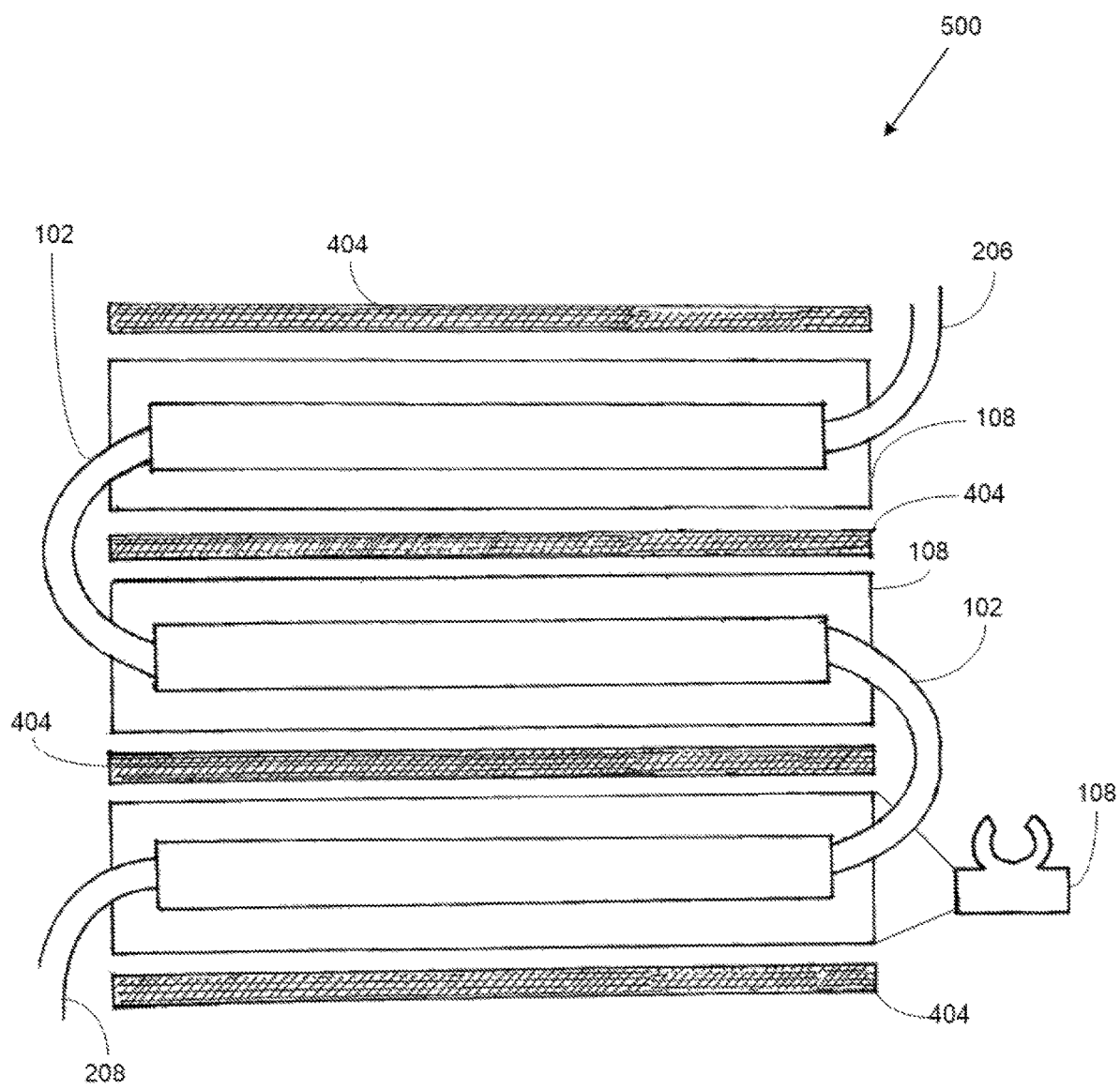
FIGS. 5A and 5B illustrate views of an exemplary direct heat exchange system having an exemplary tube portion imbedded in an exemplary floor barrier, where
Figure 5B:
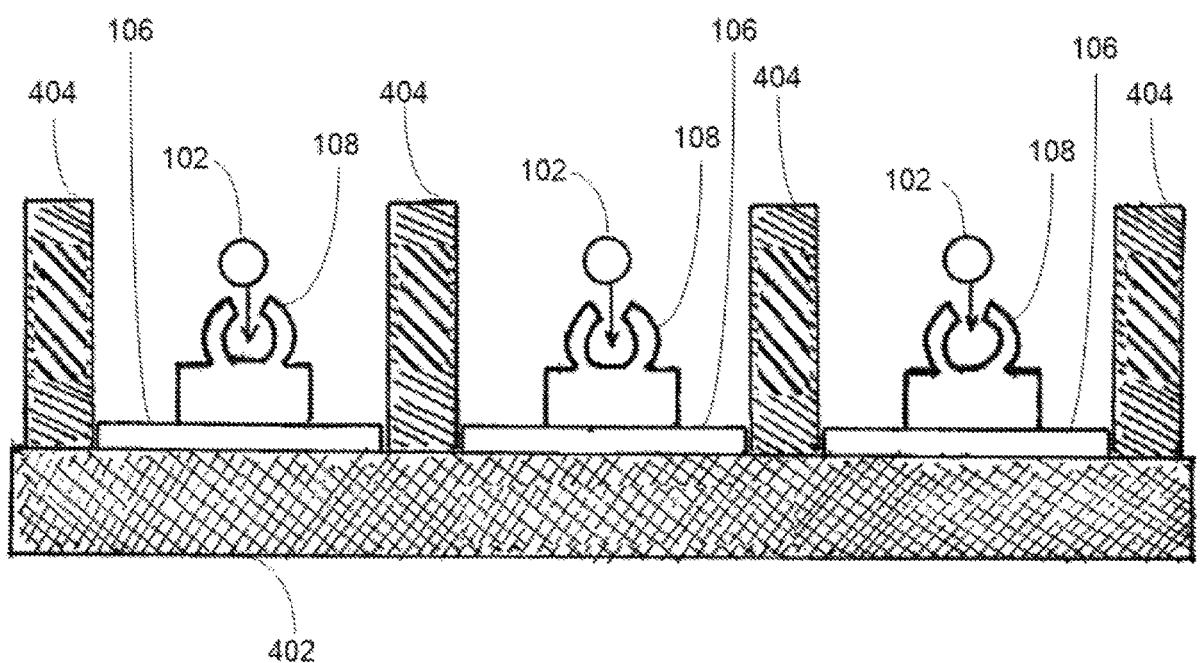

FIGS. 5A and 5B illustrate views of an exemplary direct heat exchange system having an exemplary tube portion imbedded in an exemplary floor barrier 500, where FIG. 5A illustrates a top view, and FIG. 5B illustrates an elevated side view, in accordance with an embodiment of the present invention. In one aspect, the tube portion may be embedded in a floor barrier. In this manner, the floor may radiate heat. The floor may include, without limitation, tiles, wooden panels, and polymer panels.

Those skilled in the art will recognize that imbedding the tube portion into a barrier, such as a ceiling, wall, or floor, may require decoupling and elevating portions of the barrier. Since the tube portion carries a multiphase substance, rather than a fluid, the thickness and diameter of the tube portion may be substantially less. Thus, the smaller dimensions of the tube portion enable the barrier to be moved less than a standard fluid carrying pipe, and the like.

Figure 6:
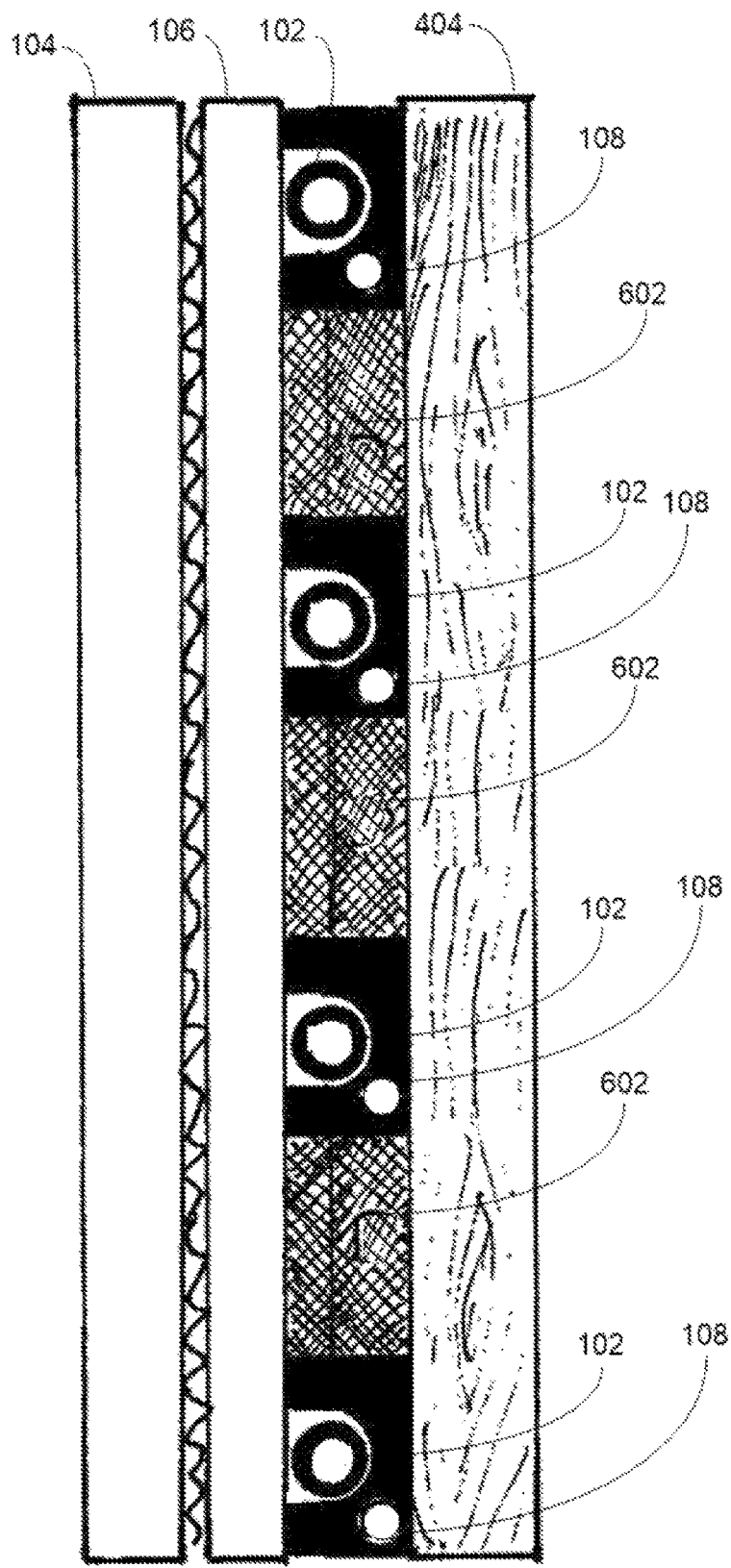
FIG. 6 illustrates a sectioned view of an exemplary direct heat exchange system having an exemplary tube portion imbedded in an exemplary block style wall barrier, in accordance with an embodiment of the present invention.

FIG. 6 illustrates a sectioned view of an exemplary direct heat exchange system having an exemplary tube portion imbedded in an exemplary block style wall barrier, in accordance with an embodiment of the present invention. In one aspect, the block style may include a thermal mass portion 602 that fills in spaces between the tube portion and the barrier portion. The thermal mass portion may at least partially surround the tube portion, so as to minimize heat loss during the heat exchange by serving as an insulation. The thermal mass portion may fill the spaces between the barrier and the conduction portion. The thermal mass portion may include a tightly packed, earth based composition, including, without limitation, earth, clay, brick, stone, tile, and stucco.

The thermal mass portion provides other advantages to the system. For example, when the heat exchange portion goes into defrost mode it may not be noticeable to the occupants. The indoor heat exchanger for the direct heat exchange system forms the structure itself (the radiating surface, floors, ceilings, walls, concrete decks, etc) that are used as an incorporated part of the heat exchanger along with the refrigerant tubes and saddles. The structure itself serves as a fundamental part of the heat exchange portion. All of these building materials have considerable mass (especially concrete). This considerable mass retains heat. Thus the thermal mass portion stores heat. When the heat exchange portion goes into defrost mode and the indoor heat exchanger changes into the evaporator so that the heat can be sent to the outdoor coil to defrost it. Because there is so much thermal mass and therefore and abundance of stored heat in the indoor heat exchanger the result is there will not even be enough temperature change for this temperature change to be perceptible to the occupants. It is not obvious that the heat exchange portion is in defrost mode. This may provide a significant and very marketable advantage because the blast of cool air that the thermal mass portion helps prevent is one of the undesirable aspects of indirect heat exchange.

Figure 7:
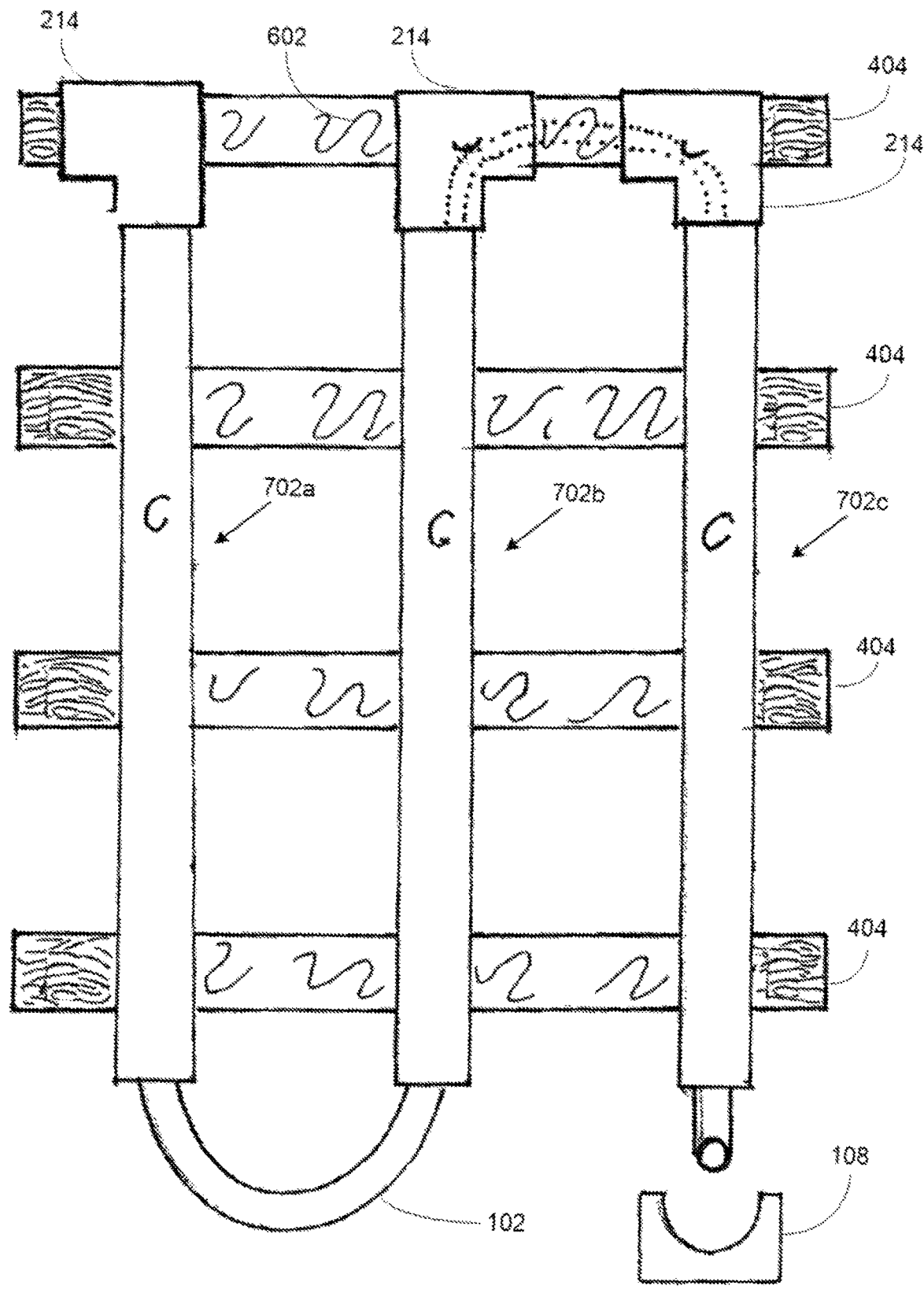
FIG. 7 illustrates a top sectioned view of an exemplary direct heat exchange system having an exemplary tube portion imbedded in an exemplary block style floor barrier, in accordance with an embodiment of the present invention.

FIG. 7 illustrates a top sectioned view of an exemplary direct heat exchange system having an exemplary tube portion imbedded in an exemplary block style floor barrier, in accordance with an embodiment of the present invention. In one aspect, a flow control portion may distribute the multiphase substance through a plurality of tube branches 702a, 702b, 702c. The tube branches may include individual tube portions that diverge throughout the barrier to create maximum heat exchange exposure. In some embodiments, each tube branch is controlled independently to create a more efficient distribution of multiphase substance, and therefore heat exchange.

Figure 8A:
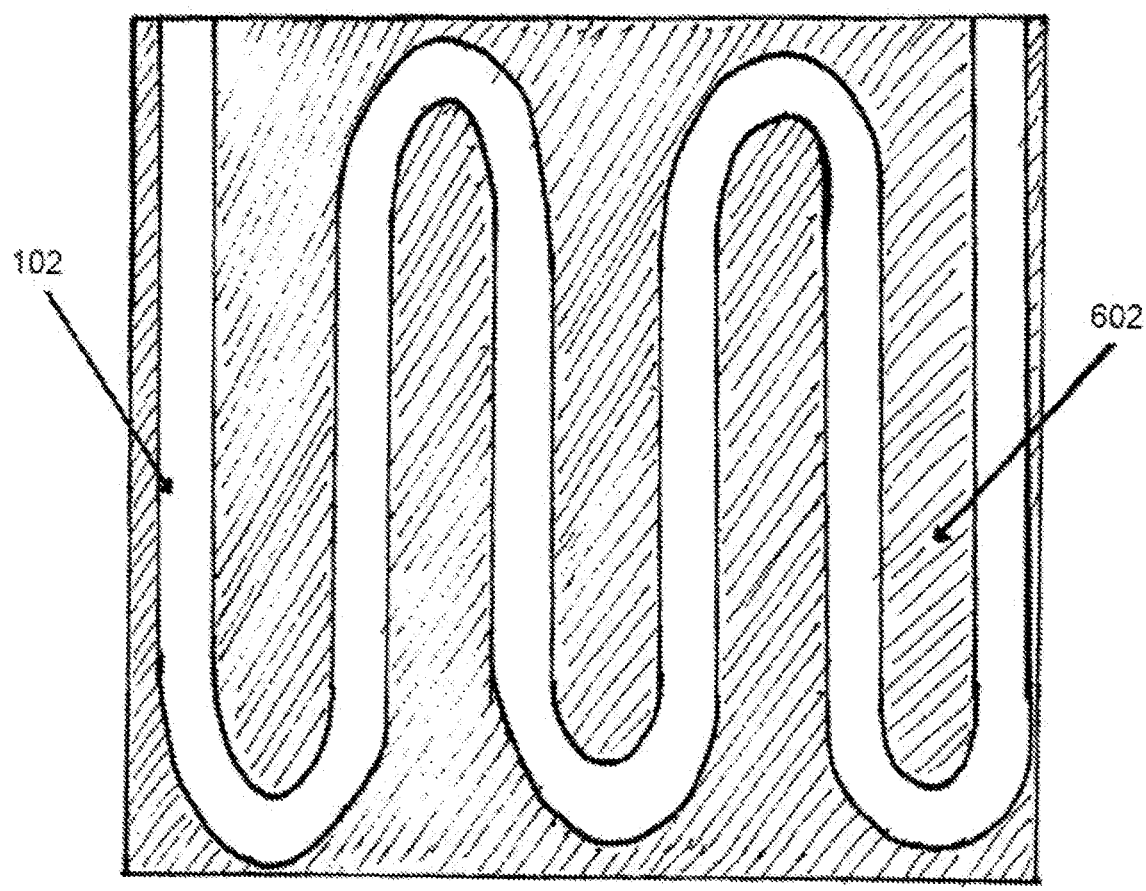
FIGS. 8A and 8B illustrate sectioned views of an exemplary direct heat exchange system having an exemplary tube portion imbedded in an exemplary barrier, where
Figure 8B:
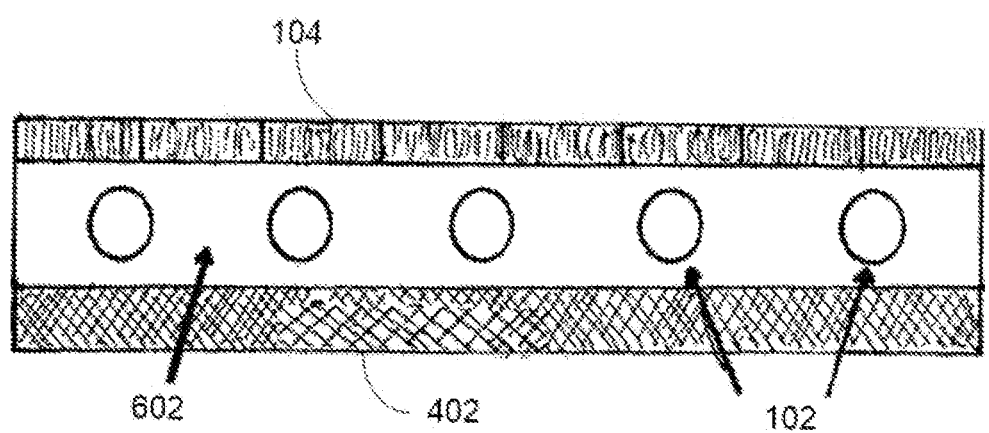

FIGS. 8A and 8B illustrate sectioned views of an exemplary direct heat exchange system having an exemplary tube portion imbedded in an exemplary barrier, where FIG. 8A illustrates a top view, and FIG. 8B illustrates a side view, in accordance with an embodiment of the present invention. In one aspect, a tube fastener may not be used when sufficient amount of thermal mass portion is used. In one embodiment, clay may be sufficiently packed around the tube portion, such that the tube portion is fastened into place, adjacent to the barrier portion.

Figure 9:
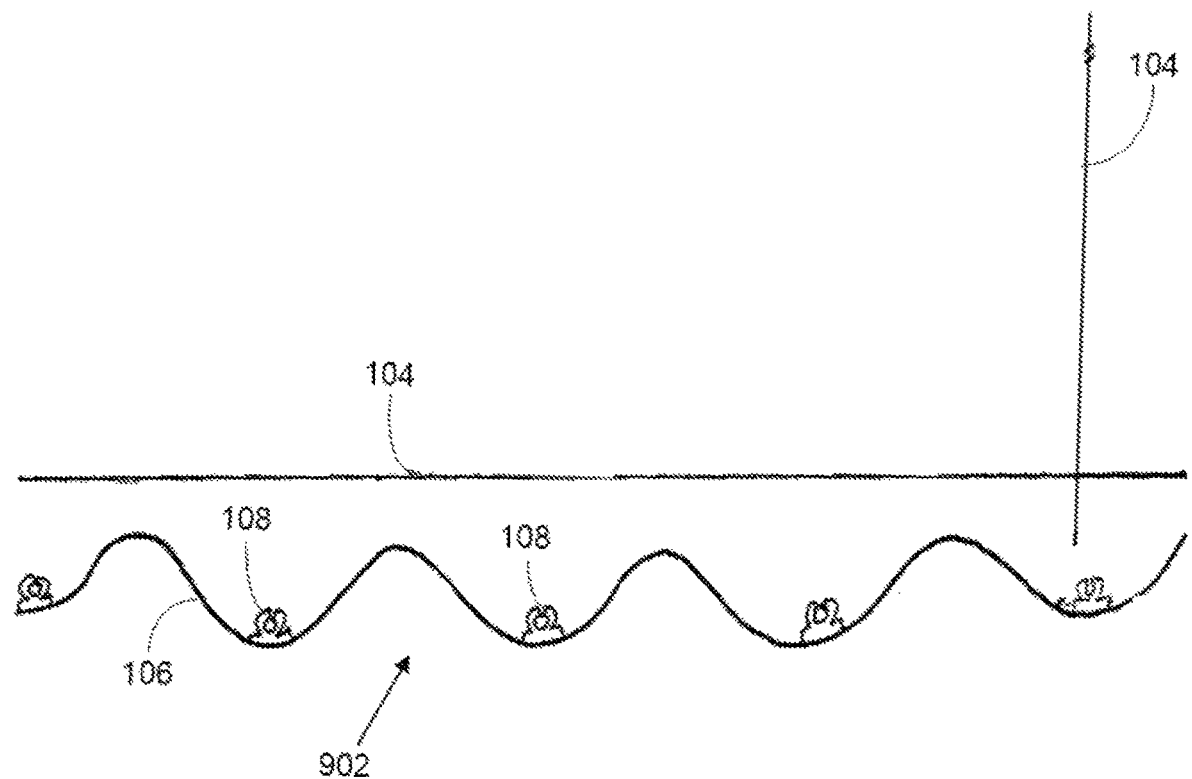
FIG. 9 illustrates a side view of an exemplary conduction portion shaped in a wave pattern, in accordance with an embodiment of the present invention.

FIG. 9 illustrates a side view of an exemplary conduction portion shaped in a wave pattern, in accordance with an embodiment of the present invention. In one aspect, the conductor portion may be shaped to form various functional and decorative designs. The conductor portion may be bent into a wavy design 902. In some embodiments, the conduction portion may include a malleable plate of metal that conforms to the orientation of the tube portion and the barrier portion.

Figure 10A:
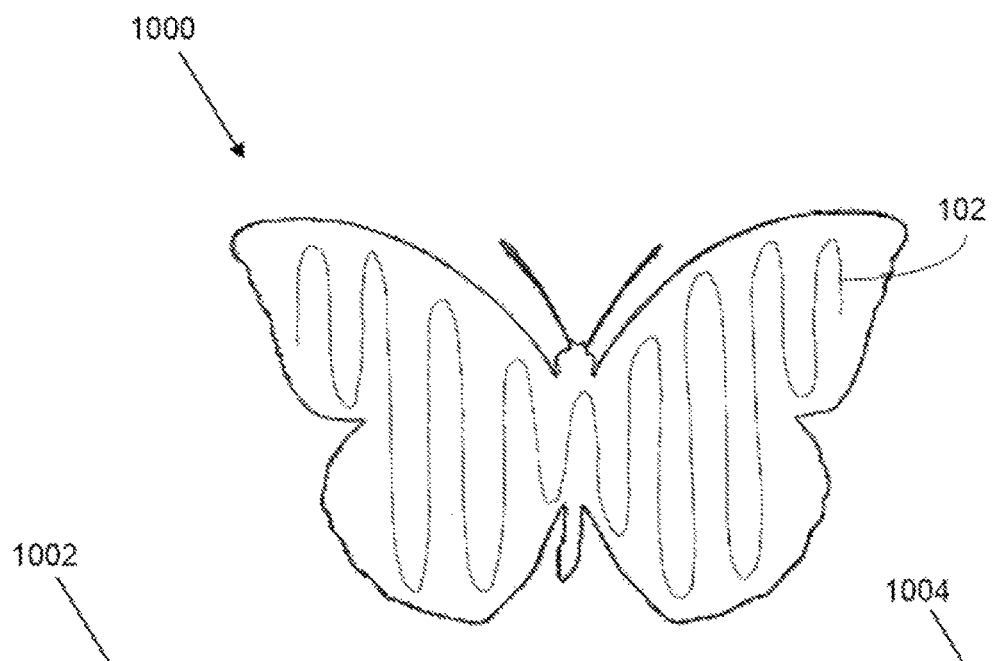
FIGS. 10A, 10B, and 10C illustrate top views of an exemplary tube portion shaped to imbed into an exemplary decorative figure, where
Figure 10B:
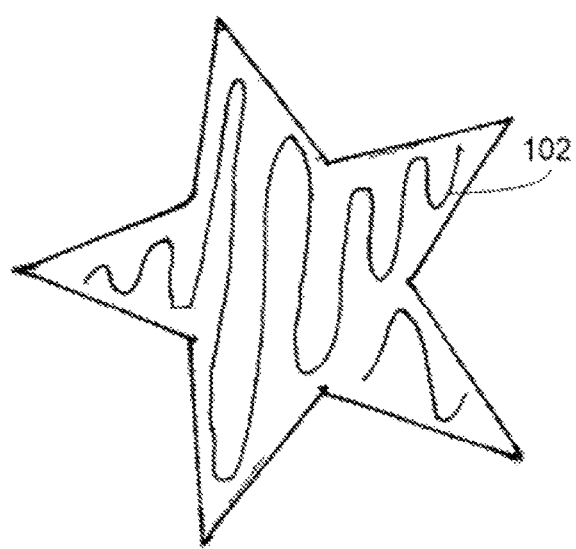
Figure 10C:
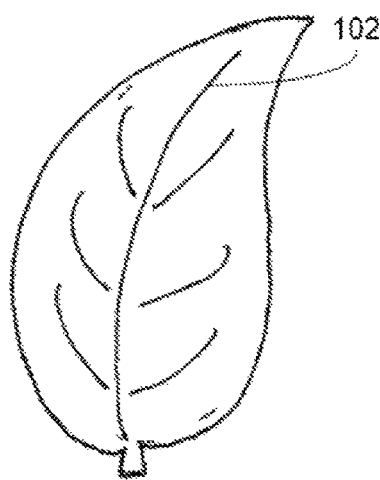

FIGS. 10A, 10B, and 10C illustrate top views of an exemplary tube portion shaped to imbed into an exemplary decorative figure, where FIG. 10A illustrates a butterfly figure 1000, FIG. 10B illustrates a star figure 1002, and FIG. 10C illustrates a leaf figure 1004. In one aspect, the tube portion may be configured to circumnavigate within the borders of the decorative figures. However, in other embodiments, any shape or figure may be constructed within the physical confines of the tube portion.

In one alternative embodiment, the system may be used to cool computers. In another alternative embodiment, a lowered false ceiling may be used in place of the heat exchange portion. This may include a T-bar ceiling or copper/aluminum paneling or suspended sheet metal designs that have an expansive surface area and are aesthetically appealing. The tube portion may be attached to these sheet metal shapes that are attached to the ceiling or suspended from the ceiling.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a direct heat exchange system that uses a multiphase gas to transfer heat according to the present invention will be apparent to those skilled in the art. Various aspects of the invention have been described above by way of illustration, and the specific embodiments disclosed are not intended to limit the invention to the particular forms disclosed. The particular implementation of the direct heat exchange system that uses a multiphase gas to transfer heat may vary depending upon the particular context or application. By way of example, and not limitation, the direct heat exchange system that uses a multiphase gas to transfer heat described in the foregoing were principally directed to a tube that carries a refrigerant to a ceiling, wall, or floor for heating and cooling implementations; however, similar techniques may instead be applied to cooling computers and servers with a tube that passes proximally to the computer hardware, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
   a heat exchange portion being configured to absorb heat while in a heating mode, said heat exchange portion further being configured to emit said heat while in a cooling mode, said heat exchange portion being disposed to at least partially engage a multiphase substance, wherein said multiphase substance is configured to at least partially exchange said heat with said heat exchange portion;
   a tube portion being configured to at least partially carry said multiphase substance, in which said multiphase substance is further configured to be generally less susceptible to temperature swings;
   a barrier portion being disposed proximally to said tube portion, said barrier portion being configured to at least partially exchange said heat with said multiphase substance for at least partially altering a temperature of ambient air;
   a flow control portion, wherein said flow control portion is configured to force said multiphase substance through said tube portion that is into engagement with said barrier portion to exchange heat with said barrier portion;
   a regulating device, said regulating device is configured to adjust a flow of said multiphase substance to allow more multiphase substance to flow to a first barrier portion area that have a generally greater need and less multiphase substance flow to a second barrier portion area that have proximately less need;
   a tube fastener, wherein said tube fastener being configured to fasten said tube portion to said barrier portion, in which said tube fastener comprises a unitary C-clamp that is configured to wrap around said tube portion to hold said tube portion in place, and in which said unitary C-clamp comprises a conductive material, said unitary C-clamp further comprises an elongated conductive material that is configured to be operable for transferring heat between said tube portion and said barrier portion;
   a sub barrier portion, said sub barrier portion is configured to provide a supportive platform opposite said barrier portion;
   a barrier anchor, said barrier anchor extends from said sub barrier portion, wherein said barrier anchor being configured to stabilize said tube portion; and
   a conductor portion, said conductor portion comprises at least a metal plate being disposed approximately between said tube portion and said barrier portion, wherein said metal plate being configured to at least partially conduct said heat between said tube portion and said barrier portion.

2. The system of claim 1 wherein, said system is configured to create a direct heat exchange between said heat exchange portion and said multiphase substance.

3. The system of claim 2 in which, said multiphase substance comprises a refrigerant that is configured to be generally less susceptible to temperature swings.

4. The system of claim 3 in which, said heat exchange portion comprises a heat pump.

5. The system of claim 4 in which, said system comprises a compressor.

6. The system of claim 5 wherein, said compressor is configured to alter a pressure of said multiphase substance.

7. The system of claim 6, in which said system comprises a liquid line and a vacuum line, said liquid line and said vacuum line being configured to carry said multiphase substance outdoors to said heat exchange portion and indoors to said barrier portion.

8. The system of claim 7 in which, said system comprises at least one of, a check valve, a metering device, and a tube joint.

9. The system of claim 8, wherein said flow control portion further being configured to regulate the flow of said multiphase substance through said tube portion.

10. The system of claim 9 in which, said tube portion comprises a copper tube.

11. The system of claim 1 in which, said tube fastener comprises a tube fastener cover.

12. The system of claim 11 in which, said barrier portion comprises at least one of, a ceiling barrier, a wall barrier, and a floor barrier.

13. The system of claim 12 in which, said metal plate being further configured to be operable to carry thermal energy between said tube portion and said barrier portion.

14. The system of claim 13 in which, said system comprises a thermal mass portion, said thermal mass portion being disposed to fill in a space between said tube portion and said barrier portion, said thermal mass portion being configured to at least partially store said heat.

15. The system of claim 14 in which, said system comprises a decorative panel, said decorative panel disposed oppositely said barrier.

16. A system consisting of:
   means for absorbing and/or emitting heat;
   means for carrying a multiphase substance, said multiphase substance carrying means is into engagement with said heat absorbing/emitting means;
   means for wrapping around said carrying means;
   means for transferring said heat between said multiphase substance and a barrier portion;
   means for forcing said multiphase substance through said barrier portion for said multiphase substance to exchange heat with said barrier portion;
   means for adjusting a flow volume of said multiphase substance to allow more multiphase substance to flow to a first barrier portion area that have a greater need and less multiphase substance to flow to a second barrier portion area that have less need;
   means for holding said carrying means in said barrier portion;
   means for controlling a flow of said multiphase substance in a first direction, said first direction is configured to heat air proximal to said barrier portion;
   means for controlling a flow of said multiphase substance in a second direction, said second direction is configured to cool air proximal to said barrier portion;
   means for dehumidifying an ambient air; and
   means for at least partially covering said carrying means.

17. A system consisting of:
   a heat exchange portion being configured to absorb heat while in a heating mode, said heat exchange portion further being configured to emit said heat while in a cooling mode, said heat exchange portion being disposed to at least partially engage a multiphase substance, in which said multiphase substance comprising a refrigerant, said heat exchange portion comprising a heat pump;
   wherein said multiphase substance is configured to at least partially exchange said heat with said heat exchange portion;
   a tube portion being configured to at least partially carry said multiphase substance, in which said tube portion comprising a copper tube;
   a barrier portion being disposed proximally to said tube portion, said barrier portion being configured to at least partially exchange said heat with said multiphase substance for at least partially altering an ambient air temperature, in which said barrier portion comprising at least one of, a ceiling barrier, a wall barrier, and a floor barrier;
   at least one tube fastener, wherein said at least one tube fastener being configured to at least partially fasten said tube portion to said barrier portion, in which said at least one tube fastener comprising a unitary C-shaped clamp, wherein said unitary C-shaped clamp is a single conductive implement that is configured to wrap around and hold said tube portion in place;
   a conductor portion being configured to at least partially conduct said heat between said tube portion and said barrier portion, wherein said conductor portion comprises at least a metal plate being disposed approximately between said tube portion and said barrier portion;
   a decorative panel, said decorative panel being disposed oppositely said barrier, said decorative panel being configured to at least partially cover said tube portion;
   a thermal mass portion, said thermal mass portion being configured to at least partially store said heat, said thermal mass portion being disposed to fill in a space between said tube portion and said barrier portion; and
   a dehumidification coil, said dehumidification coil being configured to at least partially dry said ambient air proximal to said barrier portion.

* * * * *